(12) United States Patent
Dhoolia et al.

(10) Patent No.: US 12,147,772 B2
(45) Date of Patent: Nov. 19, 2024

(54) INCEPTING CONVERSATIONAL ABILITY IN CONTENT MANAGEMENT SYSTEMS

(71) Applicant: International Business Machines Corporation, Armonk, NY (US)

(72) Inventors: Pankaj Dhoolia, Ghaziabad (IN); Li Zhu, Chappaqua, NY (US); Sachindra Joshi, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 17/560,354

(22) Filed: Dec. 23, 2021

(65) Prior Publication Data
US 2023/0206008 A1    Jun. 29, 2023

(51) Int. Cl.
*G06F 40/169* (2020.01)
*G06F 40/151* (2020.01)
*G06F 40/186* (2020.01)
*G06F 40/35* (2020.01)

(52) U.S. Cl.
CPC ............ *G06F 40/35* (2020.01); *G06F 40/151* (2020.01); *G06F 40/169* (2020.01); *G06F 40/186* (2020.01)

(58) Field of Classification Search
CPC ...... G06F 40/35; G06F 40/151; G06F 40/169; G06F 40/186
USPC .......................................... 704/10, 231, 251
See application file for complete search history.

(56) References Cited

U.S. PATENT DOCUMENTS

| 2005/0071171 A1* | 3/2005 | Dvorak .................. G10L 15/28 704/275 |
| 2014/0052716 A1 | 2/2014 | Chakra |
| 2019/0124020 A1 | 4/2019 | Bobbarjung |
| 2020/0380402 A1 | 12/2020 | Scott, II |

OTHER PUBLICATIONS

Anonymous. "Welcome to Schema.org." Printed Dec. 13, 2021. 1 page. Published by Schema. https://schema.org/.

Chatterjee et al., "Automatic Extraction of Opinion-based Q&A from Online Developer Chats", 2021 IEEE/ACM 43rd International Conference on Software Engineering (ICSE); May 22-30, 2021, Madrid, ES, DOI: 10.1109/ICSE43902.2021.00115, Publisher: IEEE, 13 pages.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — George C Monikang
(74) *Attorney, Agent, or Firm* — Heather Johnston

(57) ABSTRACT

A system may include a memory and a processor in communication with the memory. The processor may be configured to perform operations. The operations may include generating a content page and selecting an annotation container for the content page. The operations may include configuring the annotation container and inputting content into the annotation container. The operations may include submitting at least one attribute to the annotation container to associate the attribute with the content. The operations may include including the content and the at least one attribute in container data and extracting a model from the container data. The operations may include importing the model into a dialog skill and embedding the dialog skill into a user interface.

20 Claims, 7 Drawing Sheets

200

```
210  <Body>
   212  <Div>
       214  < Question >
   216  <Div>
       218  < Answer >
   222  <Div>
       224  < Question >
   226  <Div>
       228  < Answer >
```
⟵ 220

```
230  <Body>
   232  <Div>
       234  < Question >
       238  < Answer >
   242  <Div>
       244  < Question >
       248  < Answer >
```
⟵ 240

```
250  <Body>
   252  <Div>
       262  <Div>
           254  < Question >
               258  < Answer >
           264  < Question >
               268  < Answer >
```
⟵ 260

FIG. 2

INCEPTING CONVERSATIONAL ABILITY IN CONTENT MANAGEMENT SYSTEMS

BACKGROUND

The present disclosure relates to content management systems and more specifically to conversational ability using content management systems.

Various systems may be used to publish policies, information, product offerings, and service. Such systems may be used to publish content with consistent structure, style, and user experience across sites and platforms. Artificial intelligence may be built with various sources of training data, including published source content. A conversational artificial intelligence bot may be built using source content.

SUMMARY

Embodiments of the present disclosure include a system, computer-implemented method, and computer program product for incepting conversational ability in content management systems. A system in accordance with the present disclosure may include a memory and a processor in communication with the memory. The processor may be configured to perform operations. The operations may include generating a content page and selecting an annotation container for the content page. The operations may include configuring the annotation container and inputting content into the annotation container. The operations may include submitting an attribute to the annotation container to associate the attribute with the content and extracting a model from the content. The operations may include importing the model into a dialog skill and embedding the dialog skill into a user interface.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 depicts a use case diagram in accordance with some embodiments of the present disclosure.

Figure 1:
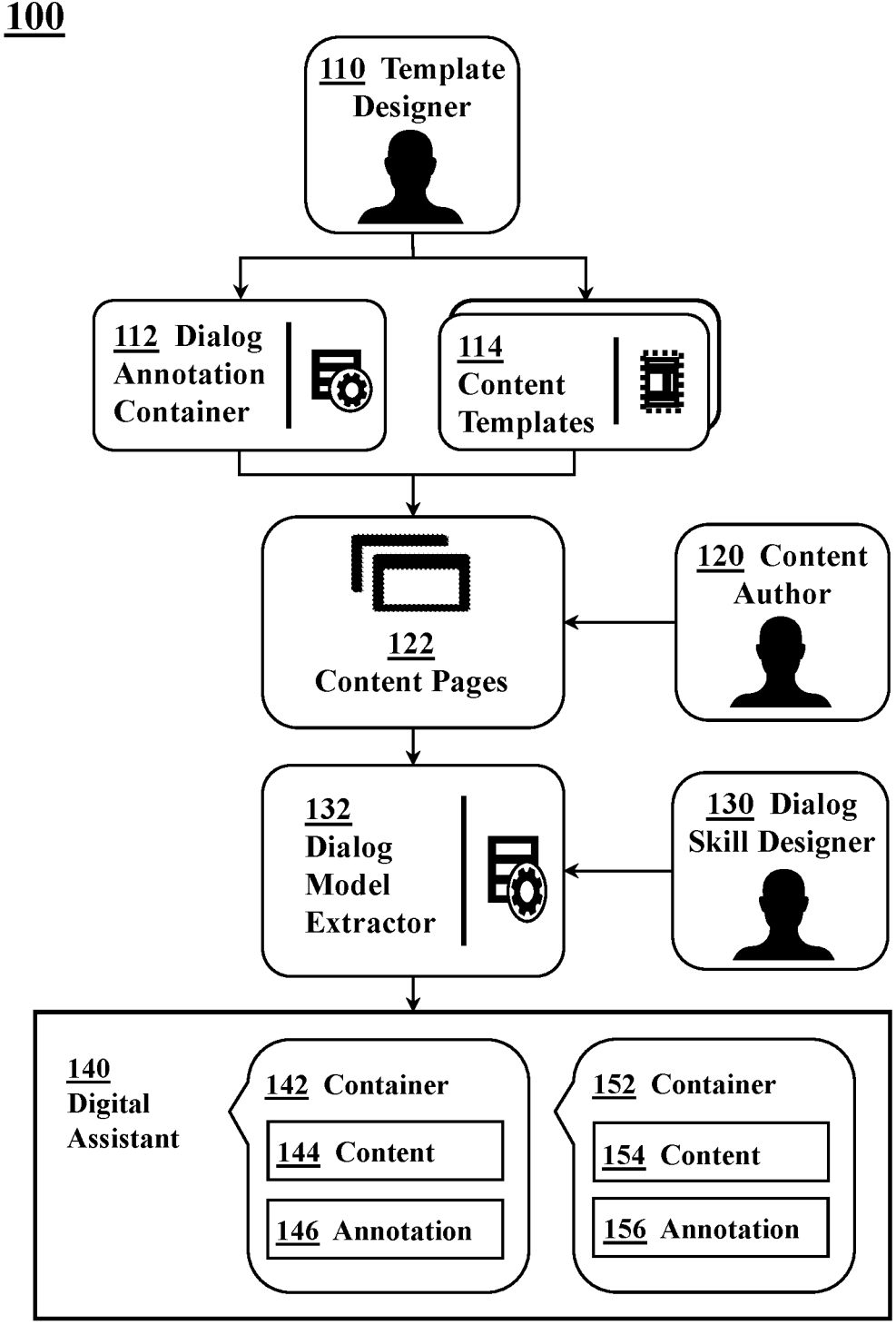
FIG. 1 illustrates a system in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to content management systems and more specifically to conversational ability using content management systems.

Systems such as a content management system (CMS) may be used to publish policies, information, product offerings, and service. Such a system may be used to assist in consistency of content structure, content style, and/or user experience across sites and platforms. Content may be used to generate artificial intelligence (AI). AI may be built with various sources of training data, including published source content. Conversational AI bots may be built with source content.

A CMS may be used to empower content generators with customizable components, templates, and other tools to publish information according to the preferences of the content generator. In some embodiments of the present disclosure, a CMS may be used to attribute conversationally relevant properties to content in a manner which may be easily integrated into a standard content publishing workflow. Thus, consistent conversational annotations may be embedded in published content.

Enabling frameworks may use annotations embedded in content to automatically generate conversational digital assistants (e.g., AI assistants); enabling frameworks may include, for example, content-to-AI enabling frameworks and search engine optimization (SEO) enabling frameworks. Conversational digital assistants are increasingly used to understand information, such as data contained in content, and perform tasks using embedded information. Content publishing may be primed for a digital assistant.

A CMS may include: one or more content-structure definitions, which may capture content attributes and types; one or more client-side renderings (e.g., html), stylings (e.g., css), and behavioral (e.g., js scripts) aspects; and one or more forms and/or dialogs to help content authors specify content for one or more components. Authors may generate templates using CMS which may: help specify consistent page layouts; use common experience fragments (such as headers and footers); and govern style and content specification consistencies via policies that help define constraints on component use. Additionally, media and document assets are available to include in a CMS. Content authors may use and/or customize experience fragments and/or specific pages for content sites.

In accordance with the present disclosure, a content template designer may enable and/or allow a dialog annotation container in the template policies for a content location and use the dialog annotation container to associate content and attributes. The content author may place content components in the dialog annotation container as well as one or more aspects to attribute the aspects with the content.

For example, a content author may generate a frequently asked questions (FAQ) page. The content author may add a question to a page by placing a question text component into the dialog annotation container and choosing a question annotation selection. The content author may also add one or more answers for the question to the dialog annotation container and select the answer annotation selection. Placing the question and the answer(s) in the same dialog annotation container associates the answers with the question.

In some embodiments, a dialog model extractor may be used to extract a conversational model from the published content embedded with conversational annotations. As a result, automatic, high-quality dialog models may be extracted from enterprise content.

The present disclosure enables minimal intrusion with maximum benefit. Existing CMS components may be used, minimal template adjustment is required to permit the additional container, and content authors may use the container only in desired circumstances.

In some embodiments of the present disclosure, published content may be constructed starting with permissions. A user may enable the use of an annotation container component by the content template. For example, a user may build the FAQ page of a website using an FAQ page template; the user may modify the layout container policy to add a dialog annotation container to the list of allowed components by searching for the dialog annotation container, selecting it to add it to the list of allowed components, and saving the policy to enable the dialog annotation container for use. Other annotation containers may be enabled similarly.

A content author may generate content using such a template. For example, a content author may generate an FAQ page using the enabled FAQ template such that the author adds content components to the FAQ page, the content to be annotated, and the one or more annotations for the content. The content author may generate annotated content by selecting the container, configuring the container, adding content to the container, and adding one or more annotations for the content to the container.

The annotation container may be configured manually or using annotation packs. Annotation packs may be used to configure various types of content; for example, one content type may be FAQ and the annotation pack may be question-answer, another content type may be instructional and the annotation pack may be how-to, and another content type may be informational and the annotation pack may be general-document. Annotation packs may be referred to by other names; for example, a question-answer annotation pack may also be referred to as a Q-A pack. Other annotation packs may be used, and annotation packs may be used as-is, customized, and/or manually constructed.

In some embodiments of the present disclosure, a content author may select a suitable annotation pack; for example, for an FAQ content section, the content author may select a question-answer annotation pack. The content author may add content and/or annotations to the container. In some embodiments, a content may load a previously saved container such that the container already contains content, one or more annotations, or both, and the content author may add to the data in the container.

Content and/or annotations may be added to annotation containers in various ways. For example, for an FAQ page, an author may choose between a granular approach of inputting questions and answers individually into an annotation container, a moderately granular approach of inputting question-answer pairs into the annotation container, or a less granular approach of inputting a question-answer accordion list into the annotation container.

In one example, an author may want the flexibility to add just a question to the annotation container. The author may select the question-answer annotation pack and select the question annotation and specify the question text as well as any desired additional content. The question content and additional content may be added using any component known in the art or hereinafter discovered or developed, and an author may also specify the content via any mechanism known in the art or hereinafter developed. An author may save the question content in the annotation container as-is, or the author may add answer content for the question in a similar way. For example, an author may add answer content by selecting the answer annotation and adding answer text and any desired additional content to the annotation container.

Additional content may be any content supplementary to the question content or the answer content. For example, additional question content may be a rephrased version of the question or a related question, and additional answer content may be an explanation for an answer or a citation of sources. Other additional content for the question and/or answer may be used in accordance with the present disclosure.

In another example, a content author may submit to the annotation container in question-answer pairs. The content author may select the question-answer annotation pack, select the question-answer pair annotation, and add question and answer content. The author may specify the question text as well as any desired additional content. An author may add answer content and any desired additional information for the question.

In another example, a content author may specify question and answer pairs accordion-style such that the questions and answers are submitted to the annotation container in bulk. The content author may select the question-answer annotation pack, select the question-answer list annotation, and add question and answer content. The author may specify the first question text as well as any desired additional content, add a first answer content and supplemental information for the question, add a second question text and desired additional content, add a second answer text and desired additional content, and so forth.

Information submitted to annotation containers may be referred to as annotation data, annotation container information, container content, and the like. Annotation data may be used to generate published content. Underlying code of a content page or the published content of the page may appear different on published pages due to page specifications and settings as well as how the annotation data was submitted.

With a granular submissions approach, each question and each answer may have its own section or division (div). For such a page with two questions and two answers, four peer level annotation containers may appear in the content. As such, relating the question with the answer may result from additional processing. For example, an answer may be linked to the immediately preceding question.

Dialog annotation containers may be annotated with microdata properties with values corresponding to the annotations selected for the annotation containers. Coding schema may be based on those known in the art or hereinafter discovered or developed. In this way, search engine optimization (SEO) benefits may be preserved and/or gained.

With a question-answer pair submission type approach, each question-answer pair may have its own section or division. For such a page with two questions and two answers, two peer level annotation containers may appear in the content. As such, each answer is linked with its respective question at the time of the submission.

With an accordion or list submission type approach, all questions and answers are hosted by the same section or division. For such a page with two questions and two answers, one peer level annotation container may appear in the content. As such, relating each question with each answer may result from additional processing. For example, an answer may be linked to an immediately preceding question. In such embodiments, a list component may be used to specify content inside the annotation container such that the iterating item of the list (e.g., the card) may implicitly be considered a question-answer pair: a head-child may implicitly be considered a question and the following-child may implicitly be considered the matching answer. As a result, the published content may be automatically be transformed into linked pairs.

In some embodiments of the present disclosure, a dialog model extraction component may propagate annotations to linked content annotations. In some embodiments, the dialog model extraction component may also transform content with annotations to a conversation model.

Annotations may be embedded in content in accordance with the present disclosure, and a dialog model for the published page may be generated therefrom. The dialog model extraction component may have one or more service points to guide the model build. For example, an author may enable or generate a skill by connecting a conversation service built using the dialog model extraction component. In some embodiments, the dialog model extractor may extract the conversational model, generate a new dialog skill, and import the extracted model. In some embodiments, chat widget assistant may be embedded with the extracted model.

Some embodiments of the present disclosure may include adding a new container component (e.g., a dialog annotation container) to content management systems that allows content authors to associate attributes (e.g., conversational attributes) to content components by placing the attributes and the content components inside the dialog annotation container. Some embodiments may maintain the separation of concerns such that no additional changes are required for pure content components. Some embodiments may allow extensible support for multiple conversation types (e.g. FAQ, how-to processes, and/or task based conversation types), using pluggable annotation-packs for each conversation-type. Some embodiments may enable supporting a content author annotation at desired levels of granularity (e.g., content-item, content-item tuples, and/or lists of content-item tuples).

In some embodiments, an accompanying annotations interpreter component (e.g., a dialog model extractor) may help transform and link to content using a dialog annotation container from a conversational model; in some embodiments, such interpretation may automatically transform the actual annotation granularity to optimal annotation granularity.

A system in accordance with the present disclosure may include a memory and a processor in communication with the memory. The processor may be configured to perform operations. The operations may include generating a content page and selecting an annotation container for the content page. The operations may include configuring the annotation container and inputting content into the annotation container. The operations may include submitting at least one attribute to the annotation container to associate the attribute with the content. The operations may include including the content and the at least one attribute in container data and extracting a model from the container data. The operations may include importing the model into a dialog skill and embedding the dialog skill into a user interface.

In some embodiments of the present disclosure, the operations may include placing the attributes and the content components inside the annotation container.

In some embodiments of the present disclosure, the operations may include transforming, automatically, an actual annotation granularity to an optimal annotation granularity.

In some embodiments of the present disclosure, the operations may include allowing the annotation container in a layout container policy.

In some embodiments, the operations may include choosing an annotations pack for the annotation container. In some embodiments, the operations may further include the annotations pack is selected from the group comprising question-answer, how-to, and general-document.

In some embodiments of the present disclosure, the operations may include specifying an annotation for the content.

In some embodiments of the present disclosure, the operations may include transforming the content with a conversational model.

FIG. 1 illustrates a system 100 in accordance with some embodiments of the present disclosure. The system 100 includes three user roles: template designer 110, content author 120, and dialog skill designer 130. In FIG. 1, the user roles are depicted as filled by different, distinct users. In some embodiments, one user may perform multiple user roles, such as two roles or all of the roles, and/or a role may be shared by multiple users.

The template designer 110 may generate a dialog annotation container 112 and content templates 114 for use in one or more content pages 122. The content author 120 may supply content for the one or more content pages 122. The one or more content pages 122 may be submitted to a dialog model extractor 132 built by a dialog skill designer 130. The dialog model extractor 132 may be used to generate a digital assistant 140. The digital assistant 140 may include two containers 142 and 152 each with container data; the container data may include various content 144 and 154 and its respective annotation 146 and 156.

FIG. 2 depicts a use case diagram 200 in accordance with some embodiments of the present disclosure. The use case diagram 200 includes a granular content set 220, a paired content set 240, and an accordion list content set 260.

The granular content set 220 includes a body 210 with two content questions 214 and 224 and two annotation answers 218 and 228. Each content question 214 and 224 and each annotation answer 218 and 228 are in their own respective divisions 212, 216, 222, and 228. Additional processing may be used to link each content question 214 and 224 with its respective annotation answer 218 and 228.

The paired content set 240 also includes a body 230 with two content questions 234 and 244 and two annotation answers 238 and 248. The first content question 234 is in the same division 232 as its corresponding annotation answer 238 and the second content question 244 is in the same division 242 as its corresponding annotation answer 248 such that the content questions 234 and 244 are linked with their corresponding annotation answers 238 and 248.

The accordion list content set 260 also includes a body 250 with two content questions 254 and 264 and two annotation answers 258 and 268. The content questions 256 are the head-children and the annotation answers 258 and 268 are the following-children such that the content questions 254 and 264 are linked with their corresponding annotation answers 258 and 268. In this accordion list content set 260, multiple divisions 252 and 262 are used such that both of the content questions 254 and 264 and both of the annotation answers 258 and 268 are aggregated in a division 262 within another division 252. In some embodiments, fewer or more divisions may be used.

A computer program product in accordance with the present disclosure may include a computer readable storage medium having program instructions embodied therewith. The program instructions may be executable by a processor to cause the processor to perform a function. The function may include generating a content page and selecting an annotation container for the content page. The function may include configuring the annotation container and inputting content into the annotation container. The function may include submitting at least one attribute to the annotation container to associate the attribute with the content. The function may include including the content and the at least one attribute in container data and extracting a model from the container data. The function may include importing the model into a dialog skill and embedding the dialog skill into a user interface.

In some embodiments of the present disclosure, the function may include placing the attributes and the content components inside the annotation container.

In some embodiments of the present disclosure, the function may include transforming, automatically, an actual annotation granularity to an optimal annotation granularity.

In some embodiments of the present disclosure, the function may include allowing the annotation container in a layout container policy.

In some embodiments, the function may include choosing an annotations pack for the annotation container. In some embodiments, the function may further include the annotations pack is selected from the group comprising question-answer, how-to, and general-document.

In some embodiments of the present disclosure, the function may include specifying an annotation for the content.

In some embodiments of the present disclosure, the function may include transforming the content with a conversational model.

Figure 3:
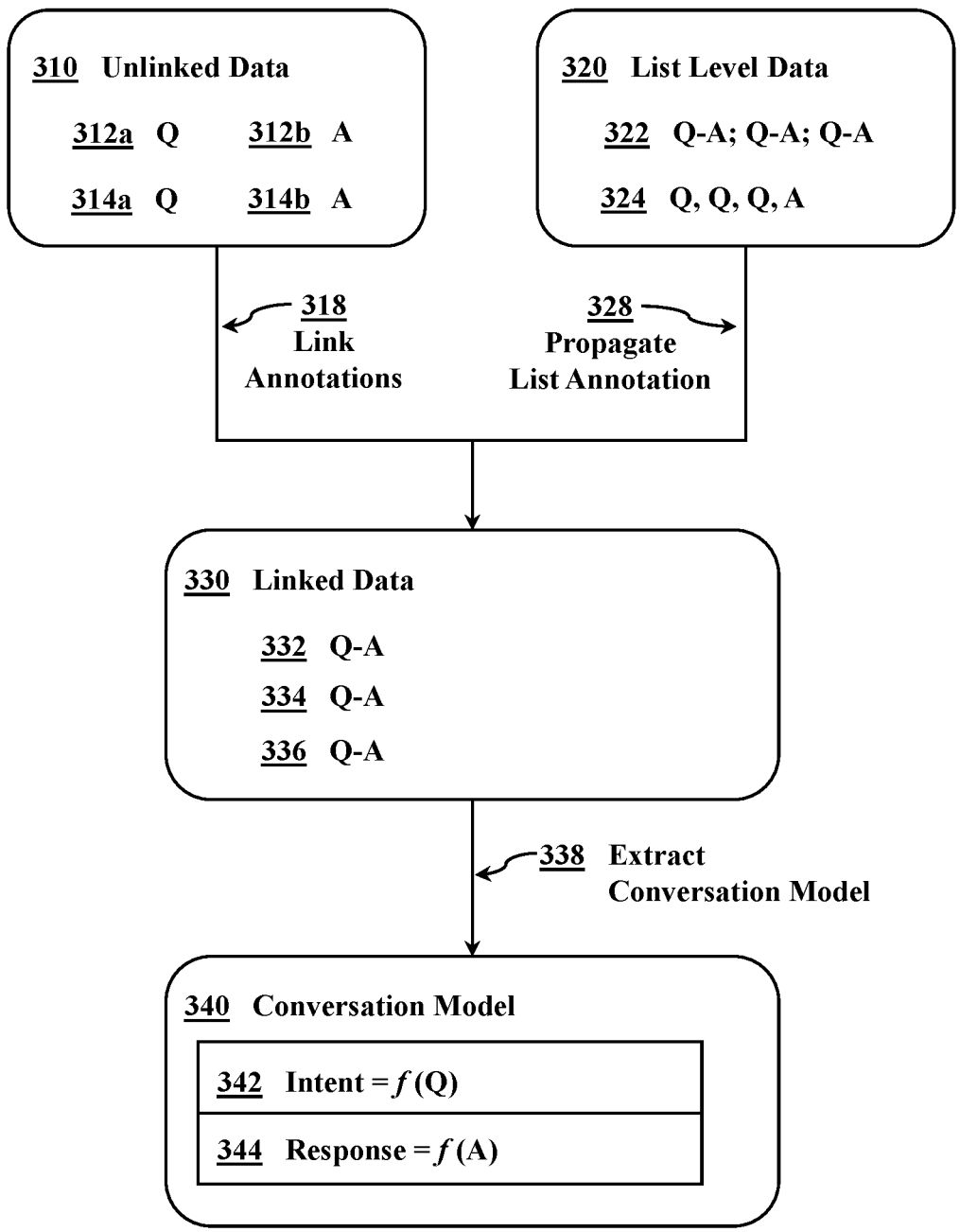
FIG. 3 illustrates a system diagram in accordance with some embodiments of the present disclosure.

FIG. 3 illustrates a system diagram 300 in accordance with some embodiments of the present disclosure. The system diagram 300 includes unlinked data 310 and list level data 320 submitted to an annotation container to link the annotations with content to render linked data 330. The linked data 330 may then be used to extract a conversation model 340.

The unlinked data 310 includes content questions 312*a* and 314*a* and annotation answers 312*b* and 314*b*. The unlinked data 310 may be linked 318 to render linked data 330. The list level data 320 includes a question-answer list 322 and an answer paired with multiple questions 324. The list level data 320 may be propagated 330 to render linked data 330.

The linked data 330 includes question-answer pairs 332, 334, and 336. The linked data 330 may be extracted 338 to render a conversation model 340. The conversation model 340 may include an intent function 342 and a response function 344.

A method in accordance with the present disclosure may include generating a content page and selecting an annotation container for the content page. The method may include configuring the annotation container and inputting content into the annotation container. The method may include submitting at least one attribute to the annotation container to associate the attribute with the content. The method may include including the content and the at least one attribute in container data and extracting a model from the container data. The method may include importing the model into a dialog skill and embedding the dialog skill into a user interface.

In some embodiments of the present disclosure, the method may include placing the attributes and the content components inside the annotation container.

In some embodiments of the present disclosure, the method may include transforming, automatically, an actual annotation granularity to an optimal annotation granularity.

In some embodiments of the present disclosure, the method may include allowing the annotation container in a layout container policy.

In some embodiments, the method may include choosing an annotations pack for the annotation container. In some embodiments, the method may further include the annotations pack is selected from the group comprising question-answer, how-to, and general-document.

In some embodiments of the present disclosure, the method may include specifying an annotation for the content.

In some embodiments of the present disclosure, the method may include transforming the content with a conversational model.

Figure 4:
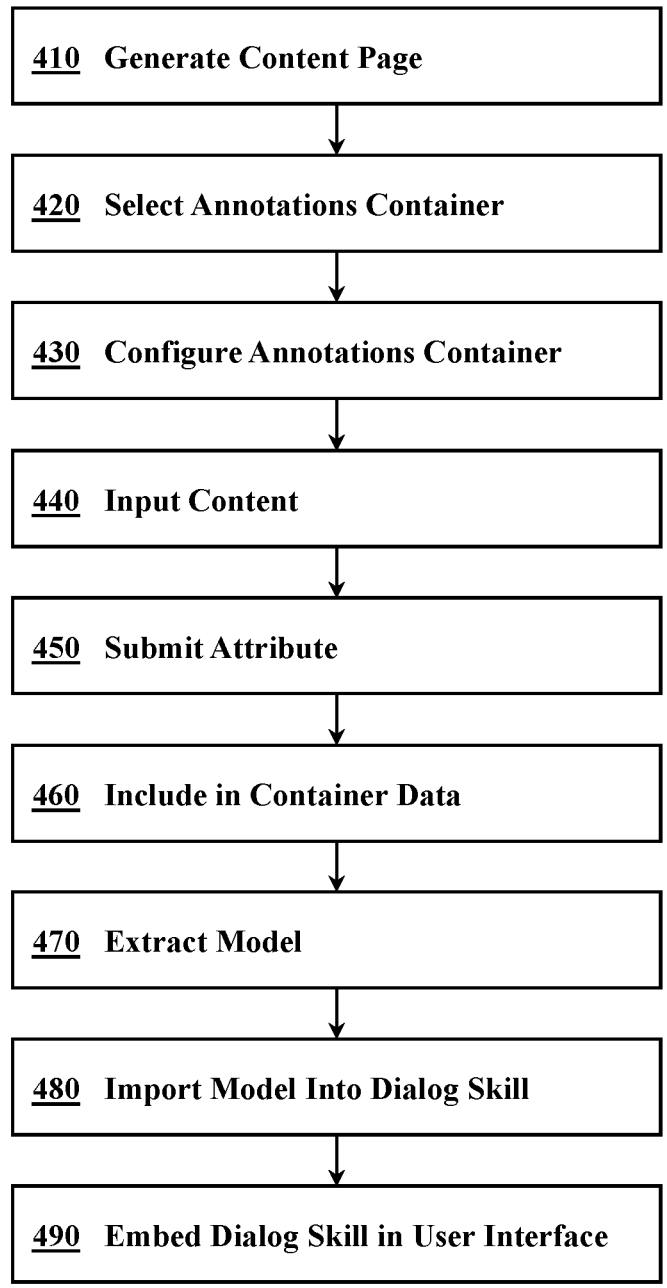
FIG. 4 depicts a computer-implemented method in accordance with some embodiments of the present disclosure.

FIG. 4 depicts a computer-implemented method 400 in accordance with some embodiments of the present disclosure. The computer-implemented method 400 includes generating 410 a content page and selecting 420 an annotation container. The computer-implemented method 400 includes configuring 430 the annotation container and inputting 440 content into the annotation container. The computer-implemented method 400 includes submitting 450 at least one attribute to the annotation container and including 460 the content and the at least one attribute in container data. The computer-implemented method 400 includes extracting 470 a model from the content and attributes in the annotation container, importing 480 the model into a dialog skill and embedding 490 the dialog skill in a user interface.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
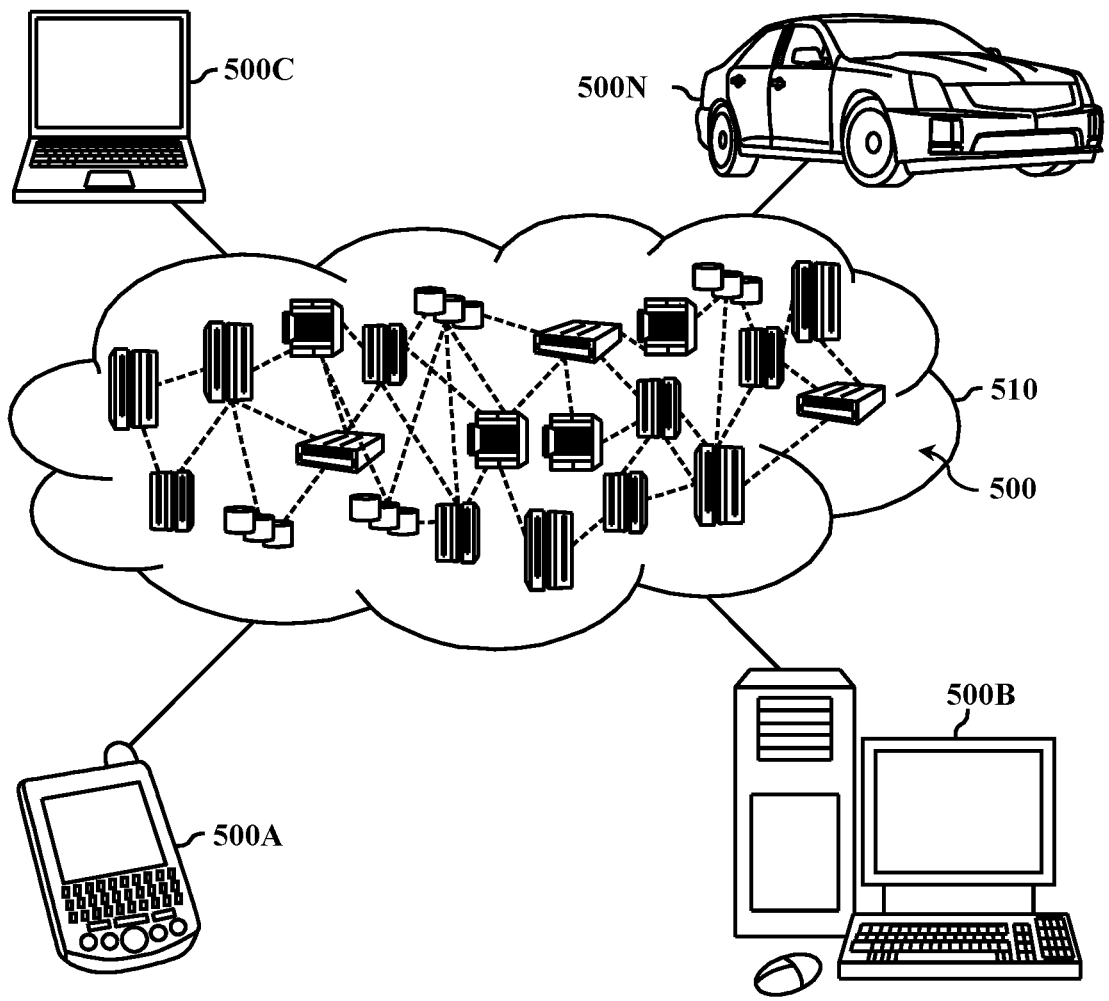
FIG. 5 illustrates a cloud computing environment, in accordance with embodiments of the present disclosure.

FIG. 5 illustrates a cloud computing environment 510 in accordance with embodiments of the present disclosure. As shown, cloud computing environment 510 includes one or more cloud computing nodes 500 with which local computing devices used by cloud consumers such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as private, community, public, or hybrid clouds as described hereinabove, or a combination thereof.

This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
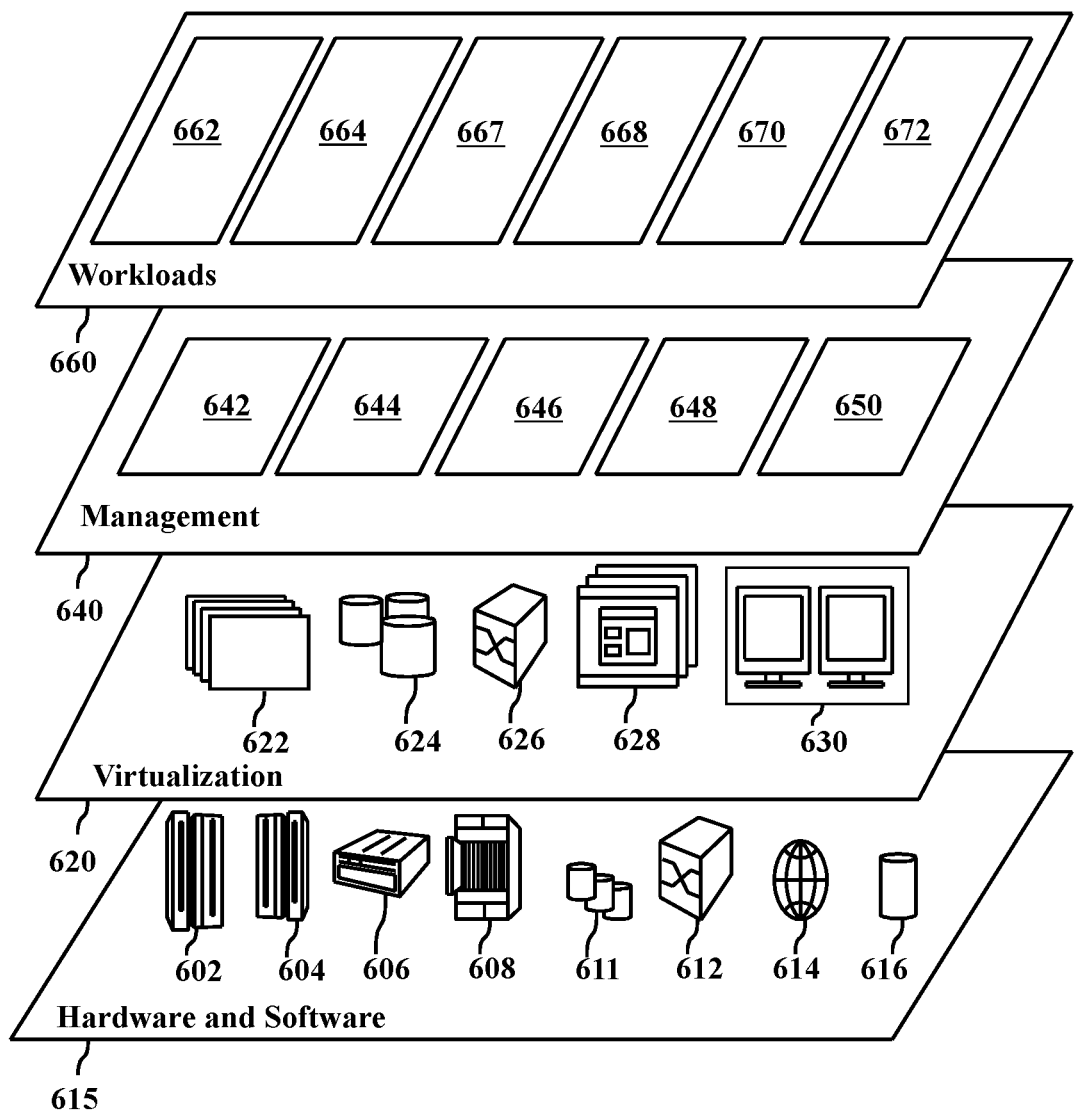
FIG. 6 depicts abstraction model layers, in accordance with embodiments of the present disclosure.

FIG. 6 illustrates abstraction model layers 600 provided by cloud computing environment 510 (FIG. 5) in accordance with embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture-based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and pricing 644 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 646 provides access to the cloud computing environment for consumers and system administrators. Service level management 648 provides cloud computing resource allocation and management such that required service levels are met. Service level agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; transaction processing 670; and conversational ability in CMS 672.

Figure 7:
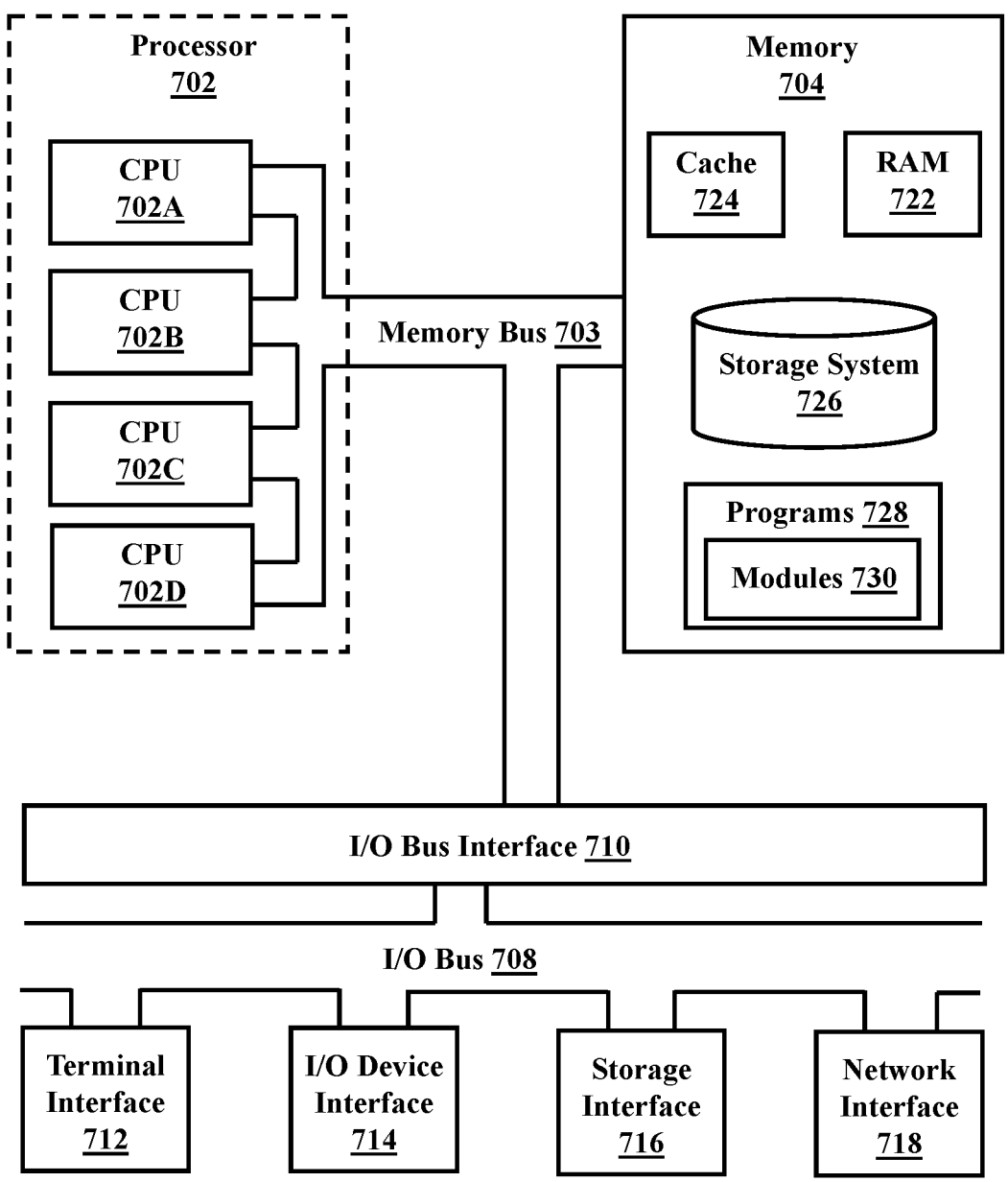
FIG. 7 illustrates a high-level block diagram of an example computer system that may be used in implementing one or more of the methods, tools, and modules, and any related functions, described herein, in accordance with embodiments of the present disclosure.

FIG. 7 illustrates a high-level block diagram of an example computer system 701 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 701 may comprise a processor 702 with one or more central processing units (CPUs) 702A, 702B, 702C, and 702D, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable CPUs 702A, 702B, 702C, and 702D, herein generically referred to as the CPU 702. In some embodiments, the computer system 701 may contain multiple processors typical of a relatively large system; however, in other embodiments, the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730, may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units 710 are shown, which separate the I/O bus 708 from various communications paths running to the various I/O devices, in other embodiments some or all of the I/O devices may be connected directly to one or more system I/O buses 708.

In some embodiments, the computer system 701 may be a multi-user mainframe computer system, a single-user system, a server computer, or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
   a memory; and
   a processor in communication with said memory, said processor being configured to perform operations comprising:
   generating a content page;
   selecting an annotation container for said content page;
   configuring said annotation container;
   inputting content into said annotation container;
   submitting an attribute to said annotation container to associate said attribute with said content;
   including said content and said at least one attribute in container data;

extracting a model from said container data, wherein said model includes at least one function;
importing said model into a dialog skill; and
embedding said dialog skill into a user interface.

2. The system of claim 1, said operations further comprising:
placing said attributes and said content components inside said annotation container.

3. The system of claim 1, said operations further comprising:
transforming, automatically, an actual annotation granularity to an optimal annotation granularity.

4. The system of claim 1, said operations further comprising:
allowing said annotation container in a layout container policy.

5. The system of claim 1, said operations further comprising:
choosing an annotations pack for said annotation container.

6. The system of claim 1, said operations further comprising:
specifying an annotation for said content.

7. The system of claim 1, said operations further comprising:
transforming said content with a conversational model.

8. A computer-implemented method, said method comprising:
generating a content page;
selecting an annotation container for said content page;
configuring said annotation container;
inputting content into said annotation container;
submitting at least one attribute to said annotation container to associate said at least one attribute with said content;
including said content and said at least one attribute in container data;
extracting a model from said container data, wherein said model includes at least one function;
importing said model into a dialog skill; and
embedding said dialog skill into a user interface.

9. The computer-implemented method of claim 8, further comprising:
placing said attributes and said content components inside said annotation container.

10. The computer-implemented method of claim 8, further comprising:
transforming, automatically, an actual annotation granularity to an optimal annotation granularity.

11. The computer-implemented method of claim 8, further comprising:
allowing said annotation container in a layout container policy.

12. The computer-implemented method of claim 8, further comprising:
choosing an annotation pack for said annotation container.

13. The computer-implemented method of claim 12, wherein:
said annotations pack is selected from the group comprising question-answer, how-to, and general-document.

14. The computer-implemented method of claim 8, further comprising:
specifying an annotation for said content.

15. The computer-implemented method of claim 8, further comprising:
transforming said content with a conversational model.

16. A computer program product, said computer program product comprising a non-transitory computer readable storage medium having program instructions embodied therewith, said program instructions executable by a processor to cause said processor to perform a function, said function comprising:
generating a content page;
selecting an annotation container for said content page;
configuring said annotation container;
inputting content into said annotation container;
submitting an attribute to said annotation container to associate said attribute with said content;
including said content and said at least one attribute in container data;
extracting a model from said container data, wherein said model includes at least one model function;
importing said model into a dialog skill; and
embedding said dialog skill into a user interface.

17. The computer program product of claim 16, said function further comprising:
placing said attributes and said content components inside said annotation container.

18. The computer program product of claim 16, said function further comprising:
transforming, automatically, an actual annotation granularity to an optimal annotation granularity.

19. The computer program product of claim 16, said function further comprising:
allowing said annotation container in a layout container policy.

20. The computer program product of claim 16, said function further comprising:
transforming said content with a conversational model.

\* \* \* \* \*